United States Patent
Koren et al.

(10) Patent No.: US 8,103,833 B2
(45) Date of Patent: Jan. 24, 2012

(54) CACHE MEMORY AND A METHOD FOR SERVICING ACCESS REQUESTS

(75) Inventors: Shai Koren, Raanana (IL); Alon Eldar, Raanana (IL); Amit Gur, Eyn Vered (IL); Itay Peled, Beer-Sheva (IL); Rotem Porat, Kfar Saba (IL)

(73) Assignee: Freescale Semiconductor, Inc., Austin, TX (US)

( * ) Notice: Subject to any disclaimer, the term of this patent is extended or adjusted under 35 U.S.C. 154(b) by 631 days.

(21) Appl. No.: 11/849,375

(22) Filed: Sep. 4, 2007

(65) Prior Publication Data

US 2009/0063779 A1 Mar. 5, 2009

(51) Int. Cl.
*G06F 12/00* (2006.01)
(52) U.S. Cl. .......................... 711/140; 711/150; 710/240
(58) Field of Classification Search .................. 711/119, 711/140, 118, 154, 150; 710/240
See application file for complete search history.

(56) References Cited

U.S. PATENT DOCUMENTS

| 5,983,023 | A | * | 11/1999 | Moriwaki et al. | 712/32 |
| 6,023,748 | A | * | 2/2000 | Peters et al. | 711/151 |
| 6,055,579 | A | * | 4/2000 | Goyal et al. | 713/375 |
| 6,088,789 | A | * | 7/2000 | Witt | 712/207 |
| 6,148,371 | A | * | 11/2000 | Hetherington et al. | 711/122 |
| 6,151,664 | A | * | 11/2000 | Borkenhagen et al. | 711/150 |
| 2006/0059312 | A1 | * | 3/2006 | Peled et al. | 711/137 |
| 2006/0064552 | A9 | * | 3/2006 | Hardage | 711/146 |
| 2007/0011382 | A1 | * | 1/2007 | Roever | 710/240 |

FOREIGN PATENT DOCUMENTS

EP 0833065 A2 12/1998
GB 2389206 A 12/2003

* cited by examiner

*Primary Examiner* — Matthew Bradley

(57) ABSTRACT

A cache memory that includes: (i) an arbitrator, connected to multiple access generator, the arbitrator is adapted to receive different types of access requests from the multiple access generators and to select a single access request per arbitration cycle; (ii) a sequence of pipeline stages, the sequence comprises an input pipeline stage that is connected to the arbiter; and (iii) multiple cache resources, connected to the sequence of pipeline stages; wherein each cache resource can be read only by a small portion of the sequence of pipeline stages and can be written to only by a small portion of the sequence of pipeline stages.

17 Claims, 4 Drawing Sheets

---

Arbitrating, by an arbitrator, between different types of access requests received from multiple access generators. The outcome of each arbitration cycle is a selected access request. 110

Providing a selected access request to a sequence of pipeline stages; wherein the sequence includes an input pipeline stage that is connected to the arbiter. 120

Processing the selected access request by the sequence; wherein the processing comprises accessing one or more cache resources; wherein each cache resource can be read only by a small portion of the sequence of pipeline stages and can be written to only by a small portion of the sequence of pipeline stages. 130

100

Arbitrating, by an arbitrator, between different types of access requests received from multiple access generators. The outcome of each arbitration cycle is a selected access request. 110

Providing a selected access request to a sequence of pipeline stages; wherein the sequence includes an input pipeline stage that is connected to the arbiter. 120

Processing the selected access request by the sequence; wherein the processing comprises accessing one or more cache resources; wherein each cache resource can be read only by a small portion of the sequence of pipeline stages and can be written to only by a small portion of the sequence of pipeline stages. 130

```
┌─────────────────────────────────────────────────┐
│   Receiving or altering a design of a cache module. 210 │
└─────────────────────────────────────────────────┘
                        │
┌─────────────────────────────────────────────────────────────┐
│  Receiving a request to update a design of a cache memory  │
│ such as to support a new access type. The cache memory is  │
│  adapted to support certain access types. The cache memory │
│    includes an arbitrator that is connected to multiple access │
│  generators. The arbitrator is adapted to receive certain types of │
│ access requests from the multiple access generators and to select a │
│      single request per arbitration cycle; and wherein the arbitrator is │
│     further connected to an input pipeline stage of a sequence of │
│            pipeline stages; wherein the sequence of pipeline stages are │
│            connected to multiple cache resources, wherein each cache │
│         resource can be read only by a small portion of the sequence of │
│    pipeline stages and can be written to only by a small portion of the │
│                    sequence of pipeline stages. │
│                              220 │
└─────────────────────────────────────────────────────────────┘
                        │
┌─────────────────────────────────────────────────────────────┐
│ Altering an arbitration scheme of an arbitrator such as to arbitrate │
│   between the certain access types and the new access type and │
│    configuring the sequence of pipeline stages to support the new │
│                           access type │
│                              230 │
└─────────────────────────────────────────────────────────────┘
```

CACHE MEMORY AND A METHOD FOR SERVICING ACCESS REQUESTS

FIELD OF THE INVENTION

The present invention relates to cache memories and to methods for servicing access requests.

BACKGROUND OF THE INVENTION

Cache memories are high-speed memories that facilitate fast retrieval of data or instructions. Typically, cache memories are relatively expensive and are characterized by a small size, especially in comparison to external memories. Great Britain patent 2389206 titled "cache control using queues to buffer requests and date" and European patent application EP0883065A2 titled "Non-blocking pipelined cache" illustrate various prior art cache memories.

Typically, a cache memory includes multiple cache resources. Each cache resource is preceded by a dedicated arbitrator that arbitrates between different requests to access this cache resource. Cache resources can include data memory, tag memory, hit/miss calculation logic, dirty/valid memory, and the like.

FIG. 1 illustrates a prior art cache memory 10 and its environment. Cache memory 10 is connected to multiple access generators 12(1)-12(M). An access generator can generate an access request. Typical access generators include processors, controllers, Direct Memory Access controllers and the like.

Cache memory 10 includes multiple arbitrators 16(1)-16(N) and multiple cache resources 18(1)-18(N). Each cache resource is preceded by an arbitrator.

The arbitrators are usually complex and tailored to each cache resource. The same access generator can be connected in parallel to multiple arbitrators. If a cache memory is expected to support a new access generator then multiple arbitrators should be re-designed. In addition, having a tailored arbitrator per cache resource is not efficient.

There is a need to provide a system and a method that can effectively manage access requests of different types.

SUMMARY OF THE PRESENT INVENTION

A cache memory that includes: (i) an arbitrator, connected to multiple access generators, the arbitrator is adapted to receive different access requests to select a single access request per arbitration cycle; (ii) a sequence of pipeline stages, the sequence comprises an input pipeline stage that is coupled to the arbiter; and (iii) multiple cache resources, wherein each cache resource can be read only by a small portion of the sequence of pipeline stages and can be written to only by a small portion of the sequence of pipeline stages.

A method for servicing access requests, the method includes: (i) arbitrating, by an arbitrator, between different types of access requests from multiple access generators; (ii) providing a selected access request to a sequence of pipeline stages; wherein the sequence comprises an input pipeline stage that is coupled to the arbiter; and (iii) processing the selected access request by the sequence; wherein the processing includes accessing one or more cache resources; wherein each cache resource can be read only by a small portion of the sequence of pipeline stages and can be written to only by a small portion of the sequence of pipeline stages.

A method for designing a cache memory, the method includes: (i) receiving a request to update a design of a cache memory such as to support a new access type; wherein the cache memory is adapted to support certain access types; wherein the cache memory comprises an arbitrator that is connected to multiple access generators, the arbitrator is adapted to receive certain types of access requests from the multiple access generators and to select a single access request per arbitration cycle; and wherein the arbitrator is further coupled to an input pipeline stage of a sequence of pipeline stages; wherein the sequence of pipeline stages are coupled to multiple cache resources, wherein each cache resource can be read only by a small portion of the sequence of pipeline stages and can be written to only by a small portion of the sequence of pipeline stages; and (ii) altering an arbitration scheme of an arbitrator such as to arbitrate between the certain access types and the new access type.

BRIEF DESCRIPTION OF THE DRAWINGS

The present invention will be understood and appreciated more fully from the following detailed description taken in conjunction with the drawings in which:

FIG. 3 is a flow chart of a method for servicing access requests, according to an embodiment of the invention; and FIG. 4 is a flow chart of a method for designing a cache memory, according to an embodiment of the invention.

DETAILED DESCRIPTION OF PREFERRED EMBODIMENTS

Conveniently, a cache memory includes multiple cache resources and a sequence of pipeline stages. Each cache resource can be read only by a small portion of the sequence of pipeline stages and can be written to only by a small portion of the sequence of pipeline stages. A small portion indicates that only few (for example less than one half, less than one third or other small fraction) of the pipelines stages of a sequence of pipeline stages can access the cache resource.

Figure 1:
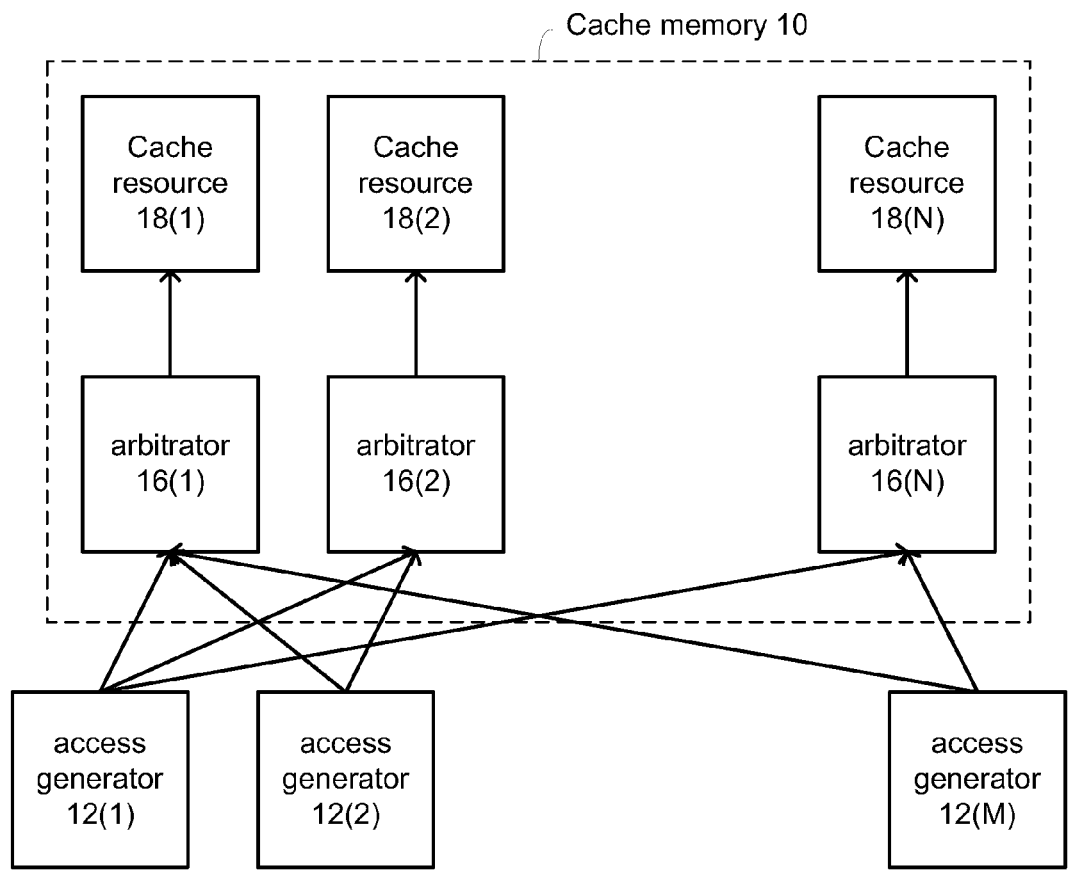
FIG. 1 illustrates a prior art cache memory and its environment.
Figure 2:
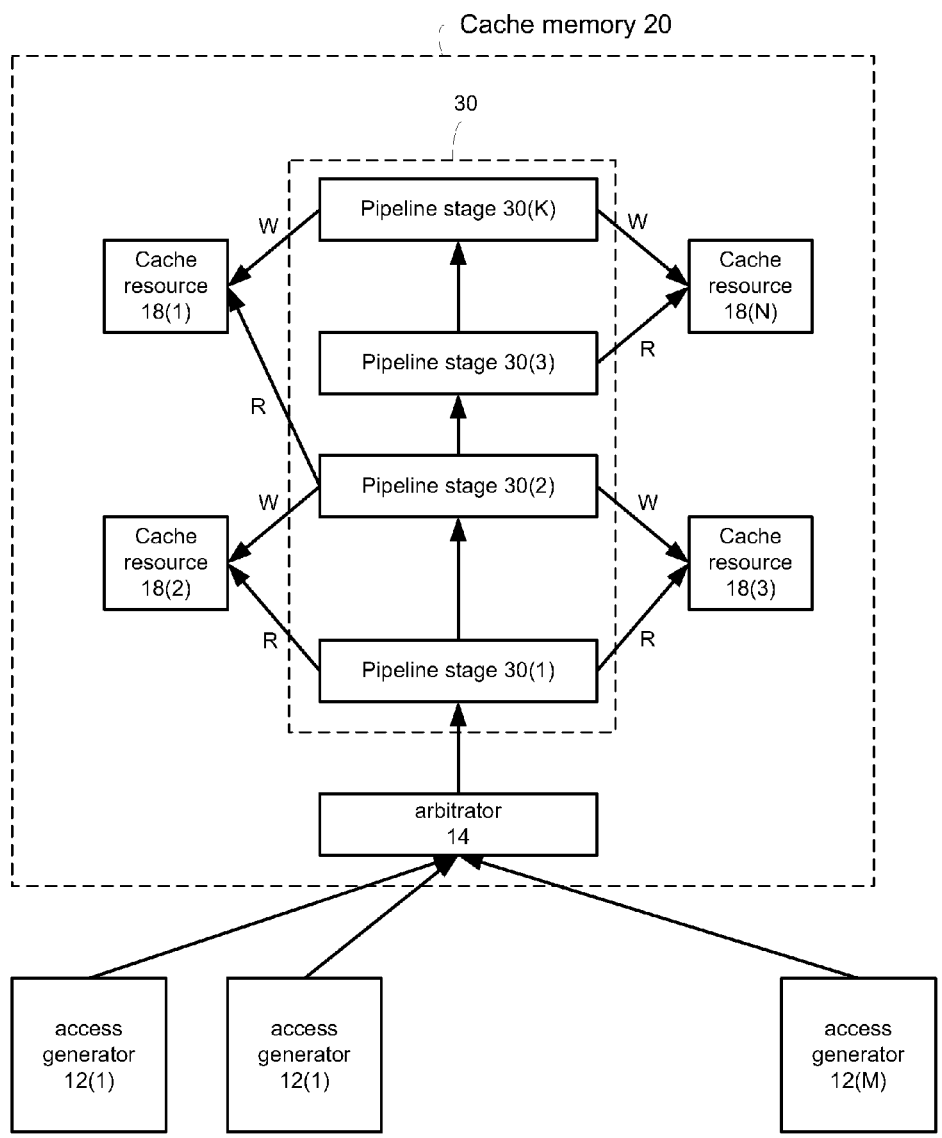
FIG. 2 is a schematic diagram of a cache memory and its environment, according to an embodiment of the invention.

FIG. 2 is a schematic diagram of cache memory 20 and its environment, according to an embodiment of the invention.

Cache memory 20 illustrates a separation between cache resource management and access management. Cache memory 20 is connected to multiple access generators 12(1)-12(M). Cache memory 20 includes a single arbitrator 14, sequence 30 of pipeline stages 30(1)-30(K), and cache resources 18(1)-18(N).

Arbitrator 14 is connected to access generators 12(1)-12(M) and to input pipeline stage 30(1). Arbitrator 14 is adapted to receive different types of access requests from the multiple access generators and to select a single access request per arbitration cycle. Arbitrator 14 can apply one or more prior art arbitration methods, including round robin, weighted round robin, fairness based arbitration schemes, priority based arbitration schemes, and the like.

Each pipeline stage is associated with an access type indicator that indicates access types serviced by that pipeline stage.

Conveniently, only few pipeline stages are adapted to perform read accesses to a specific cache resource. Only few pipeline stages are adapted to perform write accesses to the same cache resource.

According to an embodiment of the invention pipeline sequence 30 includes three or more pipeline stages out of the following: a hazard detection pipeline stage, a cache miss evaluation pipeline stage, a tag update pipeline stage, a thrash pipeline stage, a fetch pipeline stage, a set dirty pipeline stage, and a drive read data pipeline stage. According to another embodiment of the invention pipeline stage 30 includes all of the mentioned above pipeline stages.

Table 1 illustrates a relationship between various pipeline stages and cache resources. R means that the pipeline stage can read from the cache resource while W indicates that pipeline stage can write to the cache resource.

TABLE 1

| Cache resource<br>Pipeline stage \ | Hit/miss<br>calculation | Tag<br>memory | dirty<br>memory | Data<br>memory |
|---|---|---|---|---|
| Hazard detection | | | | |
| Hit/miss evaluation | W & R | R | | |
| Tag update | | W | | |
| Thrash | | | R | R |
| Fetch | | | | W |
| Set dirty | | | W | |
| Write data | | | | W |
| Drive data read | | | | R |

Table 2 illustrates various pipeline stages that are activated during various access types (read access, write access, sweep and pre-fetch).

TABLE 2

| \ Access type<br>Pipeline stage \ | Read<br>access | Write<br>access | Sweep(data<br>coherency) | Pre-fetch<br>(SW & HW<br>pre-fetch) |
|---|---|---|---|---|
| Hazard detection | + | + | − | + |
| Hit/miss evaluation | + | + | − | + |
| Tag update | Upon miss | Upon miss | − | Upon miss |
| Thrash | Upon miss | Upon miss | + | Upon miss |
| Fetch | Upon miss | − | − | + |
| Set dirty | − | + | − | − |
| Drive data read | + | − | − | − |

FIG. 3 is a flow chart of method 100 for servicing access requests, according to an embodiment of the invention.

Method 100 starts by stage 110 of arbitrating, by an arbitrator, between different types of access requests received from multiple access generators. The outcome of each arbitration cycle is a selected access request.

Stage 110 is followed by stage 120 of providing a selected access request to a sequence of pipeline stages; wherein the sequence includes an input pipeline stage that is connected to the arbiter.

Stage 120 is followed by stage 130 of processing the selected access request by the sequence. The processing includes accessing one or more cache resources. Each cache resource can be read only by a small portion of the sequence of pipeline stages and can be written to only by a small portion of the sequence of pipeline stages.

Referring to the example set fourth in FIG. 2, sequence 30 of pipeline stages 30(1)-30(K) processes the selected access request. The processing can include accessing one or more cache memory resources.

FIG. 4 illustrates method 200 for designing a cache memory according to an embodiment of the invention. It is assumed that method 200 is aimed to update an existing design of a memory cache. The existing memory cache can support certain access types and the purpose of method 200 is to add another supported access type.

Method 200 starts by stage 210 of receiving or altering a design of a cache module.

Stage 210 is followed by stage 220 of receiving a request to update a design of a cache memory such as to support a new access type. The cache memory is adapted to support certain access types. The cache memory includes an arbitrator that is connected to multiple access generators. The arbitrator is adapted to receive certain types of access requests from the multiple access generators and to select a single request per arbitration cycle. The arbitrator is also connected to an input pipeline stage of a sequence of pipeline stages. The sequence of pipeline stages is connected to multiple cache resources, such that each cache resource can be read only by a small portion of the sequence of pipeline stages and can be written to only by a small portion of the sequence of pipeline stages.

Stage 220 is followed by stage 230 of altering an arbitration scheme of an arbitrator such as to arbitrate between the certain access types and the new access type. Stage 230 can also include configuring the pipeline cache to support the new access type. The configuration can include deciding which pipeline stage should access which resources in order to support the new access type.

It is noted that method 200 can be implemented by a processor that can execute a computer code that is stored within a computer readable memory. Accordingly, a computer program product is provided. The computer program product includes a computer readable memory that stored code that once executed by a processor can implement method 200.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A cache memory, comprising:
    an arbitrator, coupled to multiple access generators, the arbitrator is adapted to receive different types of access requests from the multiple access generators and to select a single access request per arbitration cycle;
    a plurality of sequential pipeline stages, wherein the plurality of sequential pipeline stages comprises an input pipeline stage that is coupled to the arbiter, and wherein each pipeline stage of the plurality of sequential pipeline stages is associated with a type of access request; and
    multiple cache resources, each cache resource coupled to one or more pipeline stage of the plurality of sequential pipeline stages;
    wherein a particular cache resource can be read by a first pipeline stage of the plurality of sequential pipeline stages and can be written to by a second pipeline stage of the plurality of sequential pipeline stages.

2. The system according to claim 1 wherein the first pipeline stage comprises one of the following: a hazard detection pipeline stage, a cache miss evaluation pipeline stage, a tag update pipeline stage, a thrash pipeline stage, a fetch pipeline stage, a set dirty pipeline stage, and a drive read data pipeline stage.

3. The system according to claim 1 wherein the plurality of sequential pipeline stages comprises a hazard detection pipeline stage, a cache miss evaluation pipeline stage, a tag update pipeline stage, a thrash pipeline stage, a fetch pipeline stage, a set dirty pipeline stage and a drive read data pipeline stage.

4. The system according to claim 3 wherein the hazard detection pipeline stage is activated in response to a reception of a request to perform a read access, a request to perform a write access and a request to perform a pre-fetch access.

5. The system according to claim 3 wherein the cache miss evaluation pipeline stage is activated in response to a reception of a request to perform a read access, a request to perform a write access and a request to perform a pre-fetch access.

6. The system according to claim 3 wherein the tag update pipeline stage is activated in response to a read access miss, a write access miss and a pre-fetch miss.

7. The system according to claim 3 wherein the thrash pipeline stage is activated in response to a read access miss, a write access miss, a request to perform a sweep operation and a pre-fetch miss.

8. The system according to claim 3 wherein the fetch pipeline stage is activated in response to a read access miss, and in response to a request to perform a pre-fetch operation.

9. The system according to claim 3 wherein the set dirty pipeline state is activated in response to a request to perform a write access.

10. The system according to claim 1 wherein at least one pipeline stage is adapted to perform read accesses and write accesses to a same cache resource.

11. The system according to claim 1 wherein the arbitrator is adapted to apply a round robin arbitration algorithm.

12. A method for servicing access requests, the method comprises:
   arbitrating, by an arbitrator, between different types of access requests from multiple access generators;
   providing a selected access request to access a cache memory resource to a plurality of sequential pipeline stages, wherein:
      each pipeline stage of the plurality of sequential pipeline stages is associated with a type of access request; and
      the plurality of sequential pipeline stages comprises an input pipeline stage that is coupled to the arbiter; and
   processing the selected access request by the plurality of sequential pipeline stages, wherein:
      the processing comprises accessing one or more cache resources; and
      a particular cache resource can be read by a first pipeline stage of the sequence of pipeline stages and can be written to by a second pipeline stage of the plurality of sequential pipeline stages.

13. The method according to claim 12 comprising processing the selected access request by the plurality of sequential pipeline stages, wherein the plurality of sequential pipeline stages comprises at least three pipeline stages out of the following: a hazard detection pipeline stage, a cache miss evaluation pipeline stage, a tap update pipeline stage, a thrash pipeline stage, a fetch pipeline stage, a set dirty pipeline stage, and a drive read data pipeline stage.

14. The method according to claim 12 comprising processing the selected access request by the plurality of sequential pipeline stages, wherein the plurality of sequential pipeline stages comprises: a hazard detection pipeline stage, a cache miss evaluation pipeline stage, a tap update pipeline stage, a thrash pipeline stage, a fetch pipeline stage, a set dirty pipeline stage and a drive read data pipeline stage.

15. A method for designing a cache memory, the method comprising:
   receiving a request to update a design of a cache memory such as to support a new access type, wherein:
      the cache memory is adapted to support certain access types and comprises multiple cache resources and an arbitrator that is coupled to multiple access generators;
      the arbitrator is adapted to receive certain types of access requests from the multiple access generators and to select a single access request per arbitration cycle;
      the arbitrator is further coupled to an input pipeline stage of a plurality of sequential pipeline stages; and
      each pipeline stage of the plurality of sequential pipeline stages is associated with a type of access request; and
      a particular cache resource can be read by a first pipeline stage of the plurality of sequential pipeline stages and can be written to by a second pipeline stage of the plurality of sequential pipeline stages.

16. The method according to claim 15 wherein the altering is preceded by receiving a design of a cache module.

17. The method according to claim 15 wherein the altering is preceded by generating a design of a cache module.

\* \* \* \* \*